(12) United States Patent
Wang et al.

(10) Patent No.: US 7,906,233 B2
(45) Date of Patent: Mar. 15, 2011

(54) LITHIUM ION SECONDARY BATTERY

(75) Inventors: Chuanfu Wang, Shenzhen (CN); Xi Shen, Shanghai (CN)

(73) Assignee: BYD Company Limited, Shenzhen (CN)

( * ) Notice: Subject to any disclaimer, the term of this patent is extended or adjusted under 35 U.S.C. 154(b) by 1165 days.

(21) Appl. No.: 10/975,905

(22) Filed: Oct. 27, 2004

(65) Prior Publication Data

US 2005/0084750 A1    Apr. 21, 2005

(30) Foreign Application Priority Data

Oct. 28, 2003  (CN) .......................... 2003 1 0111966

(51) Int. Cl.
  *H01M 2/18*  (2006.01)
  *H01M 6/00*  (2006.01)
(52) U.S. Cl. ........ 429/130; 429/131; 429/136; 429/139; 29/623.1; 29/623.2
(58) Field of Classification Search .................. 429/131, 429/130, 136, 142, 163, 157, 175, 176, 138, 429/139; 29/623.1, 623.2, 623.3
See application file for complete search history.

(56) References Cited

U.S. PATENT DOCUMENTS

2003/0194607 A1 * 10/2003 Huang .......................... 429/176

FOREIGN PATENT DOCUMENTS

| JP | 2003-92143 | 3/2003 |
|----|------------|--------|
| JP | 2003-92144 | 3/2003 |
| JP | 2003-92145 | 3/2003 |

* cited by examiner

*Primary Examiner* — Raymond Alejandro
(74) *Attorney, Agent, or Firm* — Venture Pacific Law, PC

(57) ABSTRACT

A type of lithium ion secondary battery is disclosed; therein, the positive electrode 1 is formed by smearing an active material on the surface of an aluminum foil body, where said active material is compound oxide(s) comprising transition metals and lithium capable of absorbing and releasing lithium ions; the negative electrode 2 is formed by smearing an active material on the surface of a copper foil body, where said active material includes carbon material capable of absorbing and releasing lithium ions. Both the positive and negative electrodes have conducting strips acting as current conductors 6, 7. The positive and negative electrodes 1, 2 are in plate form and are alternately stacked on both sides of the belt-shaped separator 3 to form the electrode core 4. The separator 3 wraps around said electrode plates and separates the positive and negative electrodes 1, 2. This type of lithium ion secondary battery can effectively use the internal space of a battery shell, increase the battery's energy density, improve the large current discharge characteristic of the lithium ion secondary battery, the self-discharge ability, the battery's cycling capability and the battery's capacity.

14 Claims, 3 Drawing Sheets

LITHIUM ION SECONDARY BATTERY

CROSS REFERENCE

This application claims priority to a Chinese patent application entitled "Cylindrical Lithium Ion Secondary Batteries" filed on Sep. 1, 2003, having a Chinese Patent Application No. 03140377.8; this Chinese application is incorporated herein by reference. This application further claims priority to a Chinese patent application entitled "Stacked Lithium Ion Secondary Batteries" filed on Sep. 1, 2003, having a Chinese Patent Application No. 03140376.X; this Chinese application is incorporated herein by reference. This application further claims priority to a Chinese patent application entitled "Lithium Ion Secondary Batteries" filed on Oct. 28, 2003, having a Chinese Patent Application No. 2003101119664; this Chinese application is incorporated herein by reference.

This application is a continuation-in-part of and claims priority from a U.S. application entitled "Cylindrical Lithium Ion Battery" filed on Aug. 26, 2004 having an application Ser. No. 10/927,670. This application is a continuation-in-part of and claims priority from a U.S. application entitled "Stacked Type Lithium Ion Secondary Battery" filed on Aug. 31, 2004 having an application Ser. No. 10/932,362. All of the above applications are incorporated herein by reference.

FIELD OF INVENTION

The present invention relates to a type of lithium ion secondary battery, and, in particular, to a rectangular shaped, stacked-type lithium ion secondary battery that is space usage efficient.

BACKGROUND

Along with the rapid development of science and technology, electronic instruments and the miniaturization of electronic equipment are placing higher and higher demands on the characteristics of secondary batteries. From its combined characteristics, lithium ion secondary batteries have the highest development and application potential and very good characteristics as secondary batteries. A widely used battery type in the market place is the cylindrical lithium ion secondary battery made from belt-shaped positive and negative electrodes, and a separator all rolled into a cylindrically-shaped core and encased in a battery shell; or, a belt-shaped positive electrode, negative electrode, and separator all rolled into a cylindrically-shaped core and flattened and inserted in to a rectangular shaped battery shell forming a rectangular-shaped lithium ion secondary battery. However, the problem with this type of structure for a rectangular lithium ion secondary battery is that its space usage efficiency is low.

When compared to other secondary batteries, the internal resistance of lithium ion batteries is higher. Thus the voltage rapidly decreases during high discharge, the discharge time greatly shortens, and the battery capacity highly decreases. As commonly known, the low conductivity of the electrodes is one of the primary reasons the internal resistance of a lithium ion secondary battery may be high. Currently, most of the commercial lithium ion secondary battery uses single or multiple conductors (also called current collectors) as the method for current conduction. But this method of current charge and discharge is limited to a few welding points, where conductibility is low and the current is unevenly distributed in the charging and discharging process.

Thus, the important questions in improving the characteristics of lithium ion batteries are how to effectively use the internal space of the battery shell, how to reach high battery capacity density, how to decrease the battery's internal resistance, and how to improve the large current discharge characteristic of the lithium ion secondary battery.

SUMMARY

An object of the present invention is to provide a lithium ion secondary battery that efficiently utilizes the internal space of a battery shell.

Another object of the present invention is to provide a lithium ion battery that has high capacity density, low internal resistance, good large current discharge characteristic, good self-discharging capability, good cycling ability, good safety characteristic, and high capacity.

Briefly, in the presently preferred embodiment of the present invention, a lithium ion secondary battery is disclosed, comprising one or more positive electrodes; a separator; one or more negative electrodes; electrolyte; and a battery shell; wherein an electrode core is formed by alternatingly stacking one of said positive electrodes with one of said negative electrodes separated by said separator, said separator wrapping around said electrode core each time one of said positive electrodes and one of said negative electrodes is added to the electrode core; and wherein said electrode core and said electrolyte are placed in said battery shell.

The advantages of the lithium ion secondary battery of the present invention include:

(1) efficiently using the internal space of the battery shell, thereby increasing the capacity density of the battery; and
(2) improving the large current discharge characteristic of the lithium ion secondary battery, the self-discharge capability, the safety characteristic, the cycling characteristic, and the battery capacity.

DETAILED DESCRIPTION OF THE PREFERRED EMBODIMENTS

Figure 1:
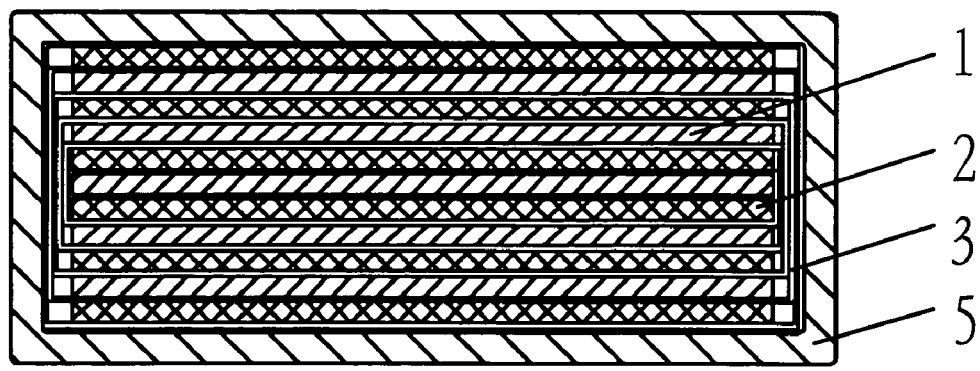
FIG. 1 is a cross-sectional view of the structure of the lithium ion secondary battery of the preferred embodiment of the present invention.

The presently preferred embodiment of the present invention discloses a lithium ion secondary battery having a positive electrode 1, a separator 3, a negative electrode 2 and non-aqueous electrolyte, encased in a battery shell 5 with its opening sealed by a battery cover.

The positive electrode 1 is formed by smearing an active material on the surface of an aluminum foil body, where said active material includes lithium capable of absorbing and releasing lithium ions and compound oxide(s) of transition metals; the negative electrode 2 is formed by smearing an active material on the surface of a copper foil body, where said active material includes carbon material capable of absorbing and releasing lithium ions.

The positive and negative electrodes 1, 2 each has a conducting strip as the current collector 6, 7; and the positive and negative electrodes 1, 2 in plate form are arranged and stacked on the two sides of the separator 3 forming said electrode core 4; and the separator 3 in the battery shell 5 is cylindrically-shaped and separates the positive and negative electrodes 1, 2 to be mutually non-conductive.

The described conductors 6, 7 of the positive and negative electrodes 1, 2 are separately stacked and are connected to the terminals of the positive and negative electrodes; and the number of cylindrically-shaped layers of the described separator 3 does not exceed six layers. The described conductor of the positive electrode 6 is strip extending from the aluminum foil body. The described conductor of the negative electrode 7 is strip extending from the copper foil body. There is at least one electrode group 4 in the battery shell 5.

As illustrated by FIGS. 1-4, in the preferred embodiment of the present invention, the positive electrodes 1 and the negative electrodes 2 are in plate form, alternately placed on the two sides of the belt-shaped separator 3, where the separator 3 is spiral or cylindrical in shape when in the battery shell 5 and it separates the positive and negative electrodes to form the electrode core 4. The above described electrode core 4 is placed into the battery shell 5 where the opening is sealed by a battery cover to complete the lithium ion secondary battery of the present invention. Therein, the preferred sizes of the positive and negative electrodes 1, 2 are the same. With the dimension of the electrodes and the internal dimension of the battery shell being the same, by using the structure of the electrode core of the preferred embodiment of the present invention, the space usage with respect to the battery shell is higher than the traditional rolled-up type of lithium ion battery. Furthermore, it has higher energy density and the battery capacity is increased.

When the battery is being used, the positive and negative electrodes may expand. For batteries having the same capacity and the same dimensions, when using the battery structure of the preferred embodiment of the present invention, the internal space usage within the battery shell is increased. Furthermore, it may also cause the electrolyte to be better distributed within the battery, and it may decrease the generation of the magnetic forces within the electrode core, thus improving the battery's self-discharging characteristic, the safety characteristic, and the cycling characteristic.

Each of the positive and negative electrodes 1, 2 has a strip extended as the positive and negative conductors 6, 7. The preferred situation is where the conductors of the positive and negative electrodes are strips extending from the foil body of the positive and negative electrodes. The positions of the conductors of the positive and negative electrodes are alternately placed, and are connected to the positive and negative terminals of the battery; therefore decreasing internal resistance and thereby improving the large current discharge characteristic of the preferred embodiment of the lithium ion secondary battery.

Figure 5:
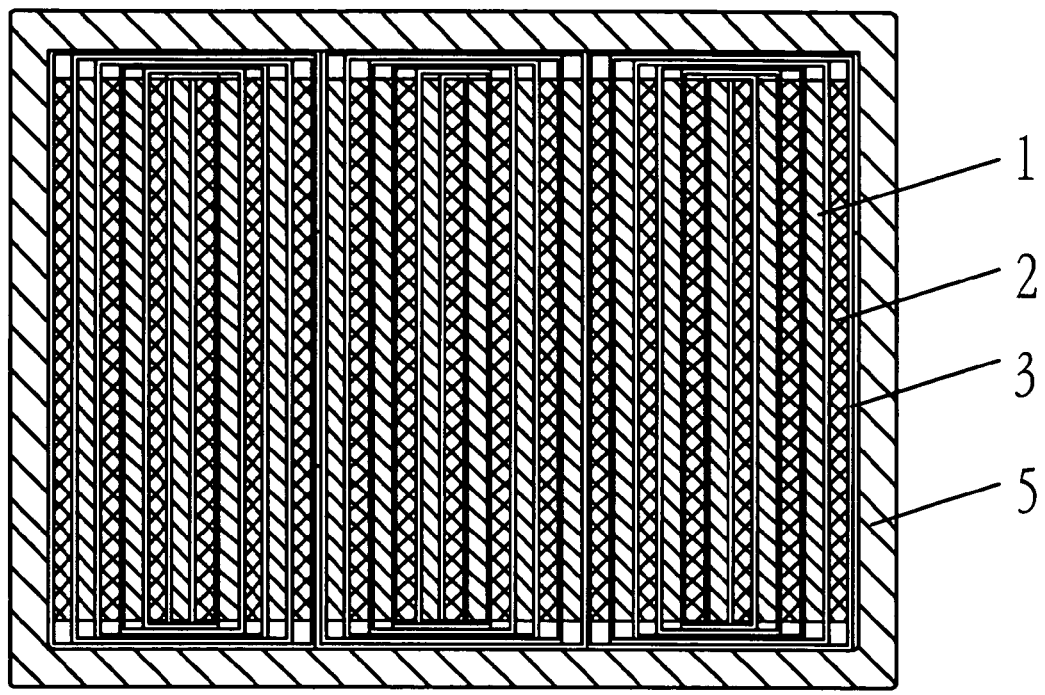
FIG. 5 is a cross-sectional view of the multiple battery cores of the lithium ion secondary battery of the preferred embodiment of the present invention.

There is at least one electrode core 4 in the battery shell 5. As illustrated by FIG. 5, there are three groups of electrode cores 3 in the battery shell. Therein, the current conductors of the positive and negative electrodes are separately arranged and connected to the positive and negative electrodes (not illustrated).

In another aspect of the present invention, novel methods in the making of the batteries of the present invention are disclosed. In a first method, a positive electrode plate is wrapped by the separator strip. Then, two negative electrode plates are added to each side of the wrapped positive electrode and the entire stack is then wrapped again by the same separator strip. This process repeats with the addition of two opposite polarity electrode plates to the stack each time and the wrapping by the separator strip of the entire stack each time until the desire number of plates is achieved. If we count the number of each time the separator wraps around the plates as two layers (of the separator material), the difference between the number of layers and the number of plates would typically be two. In the preferred embodiments, the difference would be typically be not greater than eight. Thus there would be no superfluous wrappings in order to minimize the size of the stack. Note that although this method is described using a positive electrode to start the core, a negative electrode may be used as well.

In yet another method for making a battery of the present invention, first the strip of separator may be prepared by making a stop at one edge of the strip. The stop will quickly help hold the strip in place between the first two plates of the positive and negative electrodes such that the strip can be easily wrapped between the first two plates. Previously, without the stop, the strip can easily slip out of the two electrode plates and the wrapping process has to be restarted. After the strip wraps around the two first two electrode plates to form the initial core, an additional plate of opposite polarity is placed on each side of the electrode core and the separator strip again wraps around the entire electrode core. More specifically, a positive electrode is placed against the side of the electrode core having the negative electrode and a negative electrode is placed against the side of the electrode core having the positive electrode. This process of adding sets of positive and negative electrodes and wrapping around the entire electrode core is repeated for a predetermined number of times until the desired thickness is reached. The entire electrode core is then placed into the battery shell, the electrolyte is added (either before inserting the core or after inserting the core), and the battery shell is sealed with a battery cover. Note that an extra negative electrode or positive electrode may be added to the electrode core before the final wrap.

The stop described above can be one large fold that overlaps a large part of the electrode plate or the stop can be one small fold that overlaps a small portion of the electrode plate. Moreover, the stop can be a small roll that essentially acts as a stop such that the strip of separator does not slip when pulled on to wrap around the electrode core. In this manner, the amount of strip used in minimized.

Alternatively, the strip can initially wrap around either the positive electrode or the negative electrode and then the other electrode can be added and wrapped. This method is easy but requires a longer separator strip and takes up more space in the battery shell.

In the preferred embodiments of the present invention, the total number of positive and negative electrode plates can affect the performance of the overall battery. Specifically, in the preferred embodiments of the present invention, the total number of positive and negative electrode plates should not exceed twelve (12). When the number of plates increases, the number of wraps of the separator correspondingly increases as well. Since the separator does not contribute to the capacity of the battery, it is preferable to minimize the number of plates and thereby minimizing the amount of separator in the battery.

Presently Preferred Embodiment for Comparison Purposes

Figure 2:
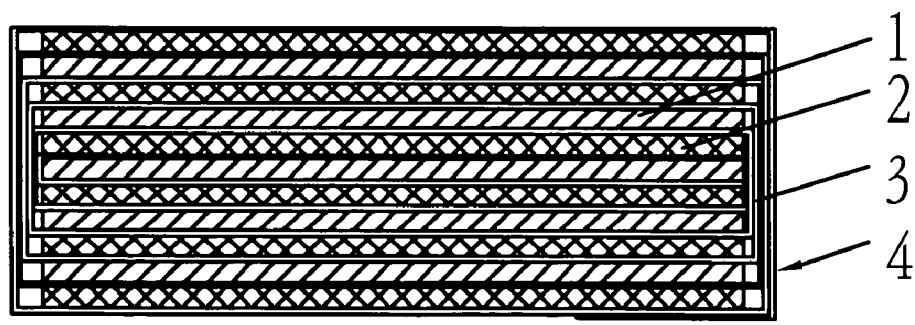
FIG. 2 is a cross-sectional view of the electrode core of the lithium ion secondary battery of the preferred embodiment of the present invention.
Figure 3:
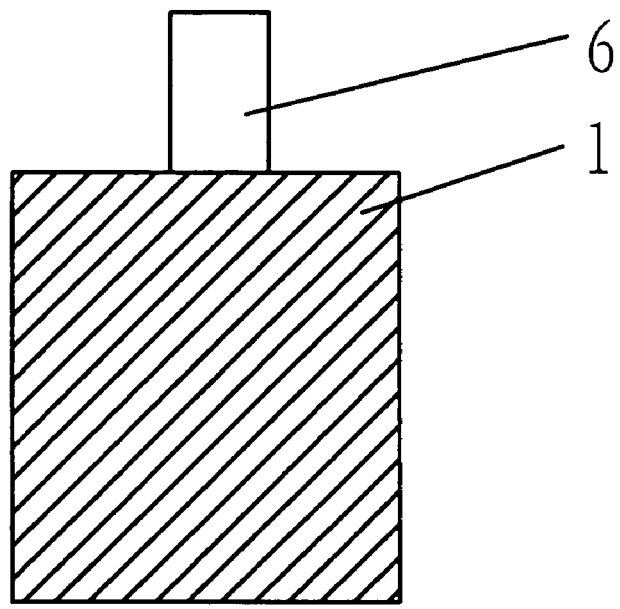
FIG. 3 is a planar view of the positive electrode of the lithium ion secondary battery of the preferred embodiment of the present invention.
Figure 4:
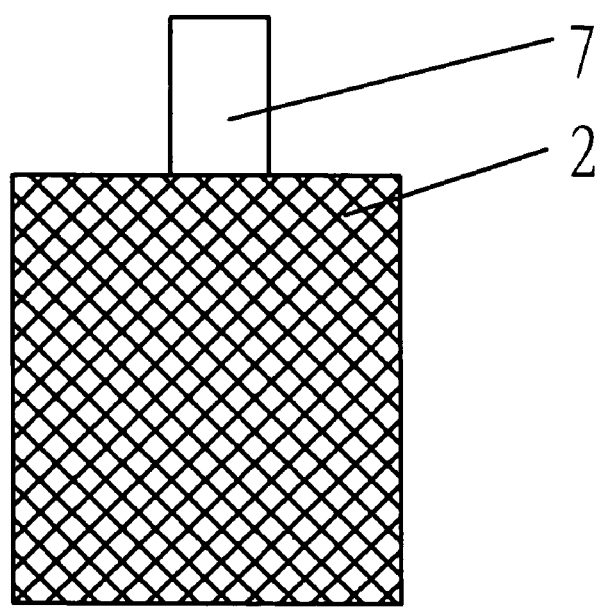
FIG. 4 is a planar view of the negative electrode of the lithium ion secondary battery of the preferred embodiment of the present invention.

The manufacturing of the lithium ion battery of the present invention is as follows: using prior art technology to obtain model type LP063450 stacked type lithium ion secondary battery, as illustrated in FIG. 1. The difference with the prior art technology is that: the positive and negative electrodes are in plate form, as illustrated by FIGS. 3 and 4. The positive and negative electrodes are alternately placed on the two sides of the belt-shaped separator 3, where the separator 3 is spiral in shape and separates the positive and negative electrodes to form the electrode core 4, as illustrated by FIG. 2.

Comparison Embodiment

Figure 6:
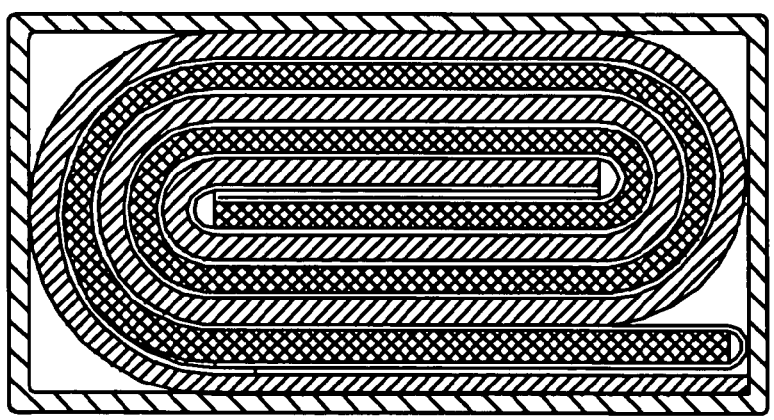
FIG. 6 is a cross-sectional view of the battery core of the lithium ion secondary battery of the prior art.

For comparison purposes, the following comparison embodiment is provided. Using prior art technology to manufacture model type LP063450 lithium ion secondary battery, the positive and negative electrodes and separator are all belt-shaped and rolled to form the electrode core illustrated in FIG. 6.

Functional Test

1. Battery Capacity Test:

Conducting capacity tests between the batteries of the present embodiment and the batteries of the comparison embodiment by using the following steps:
 (1) In a 20° C. environment, charging at 1000 mA constant voltage; with the upper voltage limit at 4.2V, cut-off current at 50 mA, let it stand for 5 minutes;
 (2) Discharging at 1000 mA constant discharge rate to 3.0V; stand for 5 minutes; and obtaining the 1 C discharge capacity for the present embodiment and the comparison embodiment which are illustrated by Table 1;

TABLE 1

|  | 1C Discharge Capacity (mAh) |
|---|---|
| Present Embodiment | 1100 |
| Comparison Embodiment | 1020 |

2. Battery Cycling Capability Test:

Conducting capacity tests between the batteries of the present embodiment and the batteries of the comparison embodiment by using the following steps:
 (1) In a 20° C. environment, charging at 1000 mA constant voltage; with the upper voltage limit at 4.2V, cut-off current at 50 mA, let it stand for 5 minutes;
 (2) Discharge at 1000 MA constant discharge rate to 3.0V; and let it stand for 5 minutes;
 (3) Repeat the above steps 500 times; and obtaining capacity maintenance rate for the present embodiment and the comparison embodiment which are illustrated by Table 2:

TABLE 2

|  | Capacity Maintenance Rate (%) |
|---|---|
| Present Embodiment | 82.4 |
| Comparison Embodiment | 73.2 |

3. Battery Self-Discharge Capability Test:

Conducting self-discharge tests between the batteries of the present embodiment and the batteries of the comparison embodiment by using the following steps:
 (1) In a 20° C. environment, charging at 500 mA constant voltage; with the upper voltage limit at 3.8V, cut-off current at 50 mA, let it stand for 5 minutes; precisely measure the battery voltage;
 (2) In a 20° C. environment, let it stand for 28 days; and again precisely measure the battery voltage; result are as illustrated by Table 3:

TABLE 3

|  | Initial Voltage | Voltage After 28 days | Amount of Decrease in Voltage |
|---|---|---|---|
| Present Embodiment | 3.7895 | 3.7883 | 12 |
| Comparison Embodiment | 3.7883 | 3.7844 | 39 |

4. Battery Safety Test:

Conducting safety tests between the batteries of the present embodiment and the batteries of the comparison embodiment by using the following steps:
 (1) In a 20° C. environment, charging at 1000 mA constant voltage; with the upper voltage limit at 4.2V, cut-off current at 50 mA, let it stand for 5 minutes;
 (2) Conduct hot temperature test at 150° C.; results are as illustrated by Table 4:

TABLE 4

|  | Temperature (° C.) | Maximum Temperature on Battery Surface (° C.) | Condition |
|---|---|---|---|
| Present Embodiment | 150 | 161 | No increase in temperature after 60 minutes |
| Comparison Embodiment | 150 | 187 | Explosion Valve opens after 32 minutes |

5. Battery Large Current Discharge Characteristics Test:

With large current discharge, $C_{3C}/C_{0.5C}$: comparing the discharge capacity rate when discharging at 3 C from 4.2V to 3.0V and discharging at 0.5 C from 4.2V to 3.0V.

With large current discharge, $C_{2C}/C_{0.5C}$: comparing the discharge capacity rate when discharging at 2 C from 4.2V to 3.0V and discharging at 0.5 C from 4.2V to 3.0V.

With large current discharge, $C_{1C}/C_{0.5C}$: comparing the discharge capacity rate when discharging at 1 C from 4.2V to 3.0V and discharging at 0.5 C from 4.2V to 3.0V.

In using different current discharge rates, the following results are obtained and listed in Table 5:

TABLE 5

|  | $C_{1C}/C_{0.5C}$ (%) | $C_{2C}/C_{0.5C}$ (%) | $C_{3C}/C_{0.5C}$ (%) |
|---|---|---|---|
| Present Embodiment | 99.7 | 97.6 | 90.2 |
| Comparison Embodiment | 99.5 | 94.4 | 74.0 |

6. Battery Internal Resistance Test:

Table 6 illustrates the battery internal resistance between a battery of the preferred embodiment and a battery of a comparison embodiment.

TABLE 6

| | Battery Internal Resistance (mΩ) |
|---|---|
| Present Embodiment | 30 |
| Comparison Embodiment | 45 |

It can be seen from Tables 1-6, by using the structure of the present invention for lithium ion secondary batteries, the large current discharge characteristic, the self-discharge characteristic, the safety characteristic, the battery cycling characteristic and battery capacity all are better with the batteries of the present invention than the batteries of traditional structure.

While the present invention has been described with reference to certain preferred embodiments, it is to be understood that the present invention is not to be limited to such specific embodiments. Rather, it is the inventor's contention that the invention be understood and construed in its broadest meaning as reflected by the following claims. Thus, these claims are to be understood as incorporating and not only the preferred embodiment described herein but all those other and further alterations and modifications as would be apparent to those of ordinary skilled in the art.

We claim:

1. A lithium ion secondary battery, comprising:
    one or more plate-shaped positive electrodes;
    a belt-shaped separator strip;
    one or more plate-shaped negative electrodes;
    electrolyte; and
    a battery shell;
    wherein an electrode core having two sides is formed by first wrapping one of said positive electrodes or negative electrodes with said separator strip, stacking on each side of said electrode core with one of said electrodes having a polarity opposite to the polarity of the electrode out-most of the electrode core further adding to the electrode core, and wrapping said electrode core with said separator strip, and repeating the stacking step and wrapping step until a pre-determined number of said electrodes are used; and
    wherein said electrode core and said electrolyte are placed in said battery shell and wherein said separator is a strip having a stopper at an edge of the strip to prevent the strip from slipping out from the first two electrode plates.

2. The battery as recited in claim 1 wherein said positive electrodes and said negative electrodes are rectangular in shape and have the same dimensions.

3. The battery as recited in claim 2 wherein said battery shell has an inner dimension having a first length, first width, and first thickness and each of said positive electrodes and negative electrodes having a second length, second width, and second thickness, wherein the first length is the same as said second length and said first width is the same as said second width.

4. The battery as recited in claim 1 wherein more than one of said electrode cores is placed in said battery shell.

5. A method for making a lithium ion secondary battery, comprising the steps of:
    placing a first plate-shaped positive electrode with a first plate-shaped negative electrode and using a belt-shaped separator strip to separate said first plate-shaped positive electrode from said first plate-shaped negative electrode to form an electrode core, and using said belt-shaped separator strip to wrap around said electrode core;
    stacking a second plate-shaped positive electrode to the side of said electrode core having the first plate-shaped negative electrode, stacking a second plate-shaped negative electrode to the side of said electrode core having the first plate-shaped positive electrode, and wrapping said belt-shaped separator strip around said electrode core;
    repeating said stacking step for a pre-defined number of times;
    inserting said electrode core into a battery shell;
    adding electrolyte into said battery shell; and
    sealing said battery shell with a battery cover and wherein before said placing step, an additional step is inserted for preparing a stopper at one edge of said strip of separator wherein said stopper preventing said strip from slipping out from said electrodes.

6. The method as recited in claim 5 wherein said positive electrodes and said negative electrodes are rectangular in shape and have the same dimensions.

7. The method as recited in claim 6 wherein said battery shell has an inner dimension having a first length, first width, and first thickness and each of said positive electrodes and negative electrodes having a second length, second width, and second thickness, and the first length is the same as said second length and said first width is the same as said second width.

8. The method as recited in claim 5 wherein more than one of said electrode cores is placed in said battery shell.

9. The method as recited in claim 5 wherein the number of said positive electrode and negative electrode in said electrode core does not exceed 12.

10. A method for making a lithium ion secondary battery, comprising the steps of:
    wrapping a first plate-shaped positive electrode or a first plate-shaped negative electrode with a belt-shaped separator strip to form an electrode core;
    stacking a second electrode of opposite polarity to each side of said electrode core, and wrapping said separator strip around said electrode core;
    repeating said stacking and wrapping step for a pre-defined number of times;
    inserting said electrode core into a battery shell;
    adding electrolyte into said battery shell; and
    sealing said battery shell with a battery cover and wherein before said wrapping step, an additional step is inserted for preparing a stopper at one edge of said strip of separator wherein said stopper preventing said strip from slipping out from said electrodes.

11. The method as recited in claim 10 wherein said positive electrodes and said negative electrodes are rectangular in shape and have the same dimensions.

12. The method as recited in claim 11 wherein said battery shell has an inner dimension having a first length, first width, and first thickness and each of said positive electrodes and negative electrodes having a second length, second width, and second thickness, and the first length is the same as said second length and said first width is the same as said second width.

13. The method as recited in claim 10 wherein more than one of said electrode cores is placed in said battery shell.

14. The method as recited in claim 10 wherein the number of said positive electrode and negative electrode in said electrode core does not exceed 12.

* * * * *